US012515670B2

(12) United States Patent
Nose et al.

(10) Patent No.: US 12,515,670 B2
(45) Date of Patent: Jan. 6, 2026

(54) VEHICLE CONTROL DEVICE, VEHICLE CONTROL METHOD, AND NON-TRANSITORY STORAGE MEDIUM STORING A VEHICLE CONTROL PROGRAM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 18/387,885

(22) Filed: Nov. 8, 2023

(65) Prior Publication Data

US 2024/0174233 A1    May 30, 2024

(30) Foreign Application Priority Data

Nov. 24, 2022   (JP) .................................. 2022-187815

(51) Int. Cl.
*B60W 30/18*    (2012.01)
*B60W 40/04*    (2006.01)
(Continued)

(52) U.S. Cl.
CPC ...... *B60W 30/18163* (2013.01); *B60W 40/04* (2013.01); *B60W 50/14* (2013.01);
(Continued)

(58) Field of Classification Search
CPC .......... B60W 30/18163; B60W 40/04; B60W 50/14; B60W 2540/215; B60W 2556/40;
(Continued)

(56) References Cited

U.S. PATENT DOCUMENTS 11,953,911 B1 *  4/2024 Mariet ................. G01C 21/367
2017/0341653 A1 * 11/2017 Kubota ............. B60W 50/0097
(Continued)

FOREIGN PATENT DOCUMENTS

| JP | 2020-166318 A | 10/2020 |
| JP | 2022-041287 A | 3/2022 |
| WO | 2019/239665 A1 | 12/2019 |

*Primary Examiner* — George C Jin
(74) *Attorney, Agent, or Firm* — Oliff PLC

(57) ABSTRACT

A vehicle control device installed at a vehicle configured to perform driving assistance, the vehicle control device comprising a processor, wherein the processor is configured to: in cases in which there is a need to change lanes at or before a specific limit point on a route to a destination, acquire traffic information for a travel route from a current position to the limit point; compute an easiness level of lane change by driving assistance in a plurality of segments on the travel route based on the acquired traffic information; extract any segments for which the easiness level computed is a reference level or higher as viable lane change segments; and in cases in which at least one of the viable lane change segments has been extracted, execute a lane change in any one of the at least one viable lane change segments that have been extracted.

10 Claims, 9 Drawing Sheets

(51) Int. Cl.
  *B60W 50/14* (2020.01)
  *G01C 21/34* (2006.01)
  *G01C 21/36* (2006.01)

(52) U.S. Cl.
  CPC ..... *G01C 21/3492* (2013.01); *G01C 21/3658* (2013.01); *G01C 21/3694* (2013.01); *B60W 2050/146* (2013.01); *B60W 2540/215* (2020.02); *B60W 2554/406* (2020.02); *B60W 2556/40* (2020.02)

(58) Field of Classification Search
  CPC ...... B60W 2554/406; B60W 2050/146; G01C 21/3492; G01C 21/3658; G01C 21/3694
  See application file for complete search history.

(56) References Cited

U.S. PATENT DOCUMENTS

| | | | |
|---|---|---|---|
| 2018/0204463 A1* | 7/2018 | Khalifeh | B60W 50/12 |
| 2020/0001893 A1* | 1/2020 | Limbacher | B60W 50/085 |
| 2021/0163011 A1 | 6/2021 | Maru et al. | |
| 2022/0063650 A1 | 3/2022 | Takabatake et al. | |
| 2022/0242440 A1* | 8/2022 | Kurtz | G01C 21/3815 |
| 2022/0371620 A1* | 11/2022 | Kawakita | B60W 60/0015 |
| 2023/0039995 A1* | 2/2023 | Lee | B60W 10/18 |
| 2023/0294684 A1* | 9/2023 | Yang | B60W 50/0097 701/26 |

\* cited by examiner

VEHICLE CONTROL DEVICE, VEHICLE CONTROL METHOD, AND NON-TRANSITORY STORAGE MEDIUM STORING A VEHICLE CONTROL PROGRAM

CROSS-REFERENCE TO RELATED APPLICATION

This application is based on and claims priority under 35 USC 119 from Japanese Patent Application No. 2022-187815 filed on Nov. 24, 2022, the disclosure of which is incorporated by reference herein.

BACKGROUND

Technical Field

The present disclosure relates to a vehicle control device, a vehicle control method, and a non-transitory storage medium storing a vehicle control program.

Japanese Patent Application No. 2022-041287 discloses an onboard display control device that, when a vehicle is attempting to merge from a cruising lane into a merge destination lane by autonomous driving, acquires information about a location where attempts to merge are ended prior to the vehicle arriving at this location, and displays that information prior to arrival thereat. This display enables an occupant to know how far attempts to merge by autonomous driving will continue, and facilitate the occupant ascertaining in advance that there is a necessity to intervene in driving operation.

However when not only for merging but also various other lane changes are needed on the way to the target destination, the technology of Japanese Patent Application No. 2022-041287 is not able to predict which timing of lane change is appropriate for the vehicle to perform such a lane change smoothly and is not able to execute lane change by driving assistance.

SUMMARY

The present disclosure provides a vehicle control device, a vehicle control method, and a non-transitory storage medium storing a vehicle control program that enable smooth execution of lane change by driving assistance.

A vehicle control device of a first aspect is installed at a vehicle configured to perform driving assistance, and includes an acquisition unit, a computation unit, an extraction unit, and a lane change unit. In cases in which there is a need to change lanes at or before a specific limit point on a route to a destination, the acquisition unit acquires traffic information for a travel route from a current position to the limit point. The computation unit computes an easiness level of lane change by driving assistance in plural segments on the travel route based on the traffic information acquired by the acquisition unit. The extraction unit extracts any segments for which the easiness level computed by the computation unit is a reference level or higher as viable lane change segments. In cases in which at least one of the viable lane change segments has been extracted by the extraction unit, the lane change unit executes a lane change by driving assistance in any one of the at least one viable lane change segments that have been extracted.

In the vehicle control device of the first aspect, the traffic information for the travel route from the current position to the limit point is acquired by the acquisition unit when there is a need to change lanes by the limit point when the vehicle configured to perform driving assistance is traveling toward the destination. Reference here to "limit point" means all sorts of locations that are locations by which point a lane change needs to be performed, such as crossroads and branch points, exits/entrances to expressways, rest facilities such as service areas and parking areas, and the destination itself. Moreover "traffic information" includes all sorts of road traffic information related to the ease of a lane change, such as traffic jam information, predicted traffic jam information, congestion information, traffic restriction information, accident information, roadwork information, and the like.

Based on the traffic information acquired by the acquisition unit, the computation unit computes the easiness level of lane change in the plural segments on the travel route from the current position to the limit point. The easiness level is an easiness level for a lane change by driving assistance.

Furthermore, the extraction unit extracts any segments for which the easiness level computed by the computation unit is the reference level or higher as "viable lane change segments".

Then in cases in which at least one of the "viable lane change segments" has been extracted by the extraction unit, lane change by driving assistance is executed by the lane change unit in one or other segment of the "viable lane change segments" that have been extracted by the extraction unit. The lane change is accordingly executed in a "viable lane change segment" that has been extracted in advance in cases in which a lane change is needed at or before the specific limit point on the route to the destination. Namely, a situation can be avoided in which the lane change by driving assistance is not able to be performed owing to traffic conditions from when the vehicle has neared the limit point. Note that reference to "execute a lane change" includes cases in which this is confined to outputting an instruction signal for lane change to another control device, for example to an advance driver assistance system-electronic control unit (ADAS-ECU) or the like that controls driving of actuators needed to execute an actual lane change.

A vehicle control device of a second aspect is the first aspect wherein predicted traffic jam information is included in the traffic information.

According to the vehicle control device of the second aspect, the easiness level of lane change is computed for plural segments on the travel route based on the traffic information including the predicted traffic jam information, and the viable lane change segments are extracted. This thereby enables a situation to be avoided in which a traffic jam occurs in a lane change destination lane and a lane change is not able to be performed by the limit point.

A vehicle control device of a third aspect is the first aspect further including a display instruction unit that displays the viable lane change segments extracted by the extraction unit on a display section provided in a cabin of the vehicle.

According to the vehicle control device of the third aspect, the "viable lane change segments" extracted by the extraction unit are displayed by the display instruction unit on the display section provided in the vehicle cabin. This thereby enables the occupant to visually ascertain in advance the "viable lane change segments" in cases in which there is a need for a lane change at or before the specific limit point on the route to destination.

A vehicle control device of a fourth aspect is the vehicle control device of the third aspect, wherein the display instruction unit displays the viable lane change segments on the display section together with a map illustrating the travel route.

In the vehicle control device of the fourth aspect, the display instruction unit displays the "viable lane change segments" on the display section provided in the vehicle cabin together with the map illustrating the travel route. This thereby enables the occupant to ascertain directly the "viable lane change segment" on the map.

A vehicle control device of a fifth aspect is the vehicle control device of the third aspect further including a desired lane change segment reception unit that, in cases in which plural of the viable lane change segments have been extracted by the extraction unit, receives information from an input section provided in the vehicle cabin related to a segment among the plural viable lane change segments at which the occupant desires a lane change to be performed. The lane change unit executes a lane change in the segment at which the occupant desires a lane change to be performed based on the information related to the segment received by the desired lane change segment reception unit.

In the vehicle control device of the fifth aspect, in cases in which plural of the "viable lane change segments" have been extracted by the extraction unit, the desired lane change segment reception unit receives the information from the input section provided in the vehicle cabin related to the segment among the plural viable lane change segments where the occupant desires the lane change to be performed. Based on the information related to this segment, the lane change is then executed by the lane change unit in this segment at which the occupant desires the lane change to be performed.

A vehicle control device of a sixth aspect is the vehicle control device of the fifth aspect, wherein the display instruction unit displays the easiness level computed by the computation unit together with the respective viable lane change segments on the display section.

In the vehicle control device of the sixth aspect, in cases in which plural of the viable lane change segments have been extracted by the extraction unit, the easiness levels computed by the computation unit are displayed by the display instruction unit on the display section together with each of the "viable lane change segments". This thereby enables the occupant to input the lane change desired segment using the input section after ascertaining the easiness level of lane change in each of the "viable lane change segments".

A vehicle control device of a seventh aspect is the first aspect further including an easiest segment identification unit that, in cases in which plural of the viable lane change segments have been extracted by the extraction unit, identifies a segment where lane change is able to be performed most easily from out of the plural viable lane change segments based on the easiness levels computed at the computation unit. The lane change unit executes a lane change in the easiest viable lane change segment.

In the vehicle control device of the seventh aspect, in cases in which plural of the "viable lane change segments" have been extracted by the extraction unit, the "easiest viable lane change segment" from out of the plural "viable lane change segments" is identified by the easiest segment identification unit based on the easiness levels computed at the computation unit. Then the lane change is executed by the lane change unit in this "easiest viable lane change segment". The lane change is accordingly executed both safely and with certainty.

A vehicle control device of an eighth aspect is the vehicle control device of the seventh aspect further including a display instruction unit that displays a statement that lane change will be performed in advance owing to traffic conditions on a display section provided in a cabin of the vehicle in cases in which the easiest viable lane change segment is remote from the limit point by a specific distance or greater.

In the vehicle control device of the eighth aspect, the statement that lane change will be performed in advance owing to traffic conditions is displayed by the display instruction unit on the display section provided in the vehicle cabin in cases in which the "easiest viable lane change segment" is remote from the limit point by the specific distance or greater. This display enables the occupant to be pre-warned of a lane change. This thereby enables, for example, a situation to be avoided in which the occupant is caught unawares when a lane change is performed a considerable distance in advance of the limit point where a lane change is needed.

A vehicle control device of a ninth aspect is the vehicle control device of the seventh aspect further including a display instruction unit that displays a proposal that lane change will be performed in advance owing to traffic conditions on a display section provided in a cabin of the vehicle in cases in which the easiest viable lane change segment is remote from the limit point by a specific distance or greater, and an agreement reception unit that receives information related to whether or not an occupant of the vehicle agrees to the proposal from an input section provided in a cabin of the vehicle and configured for input by the occupant. The lane change unit executes a lane change at the easiest viable lane change segment in cases in which agreement from the occupant has been received by the agreement reception unit.

In the vehicle control device of the ninth aspect, the display instruction unit displays the proposal that lane change will be performed in advance owing to traffic conditions on the display section provided in the vehicle cabin in cases in which the "easiest viable lane change segment" is remote from the limit point by the specific distance or greater. The agreement reception unit receives the information related to whether or not the occupant agrees to the proposal from the input section that is provided in the vehicle cabin and enables input by the occupant. Then the lane change unit executes the lane change at the "easiest viable lane change segment" in cases in which the agreement from the occupant has been received by the agreement reception unit. This thereby enables a situation to be avoided in which a lane change is executed without any consultation at a segment not intended by the occupant.

A vehicle control method of a tenth aspect is processing employed in a vehicle configured to perform driving assistance. The processing includes, in cases in which there is a need to change lanes at or before a specific limit point on a route to a destination, acquiring traffic information for a travel route from a current position to the limit point; computing an easiness level of lane change by driving assistance in a plurality of segments on the travel route based on the traffic information; extracting any segments for which the easiness level is a reference level or higher as viable lane change segments; and in cases in which at least one of the viable lane change segments has been extracted, executing a lane change in any one of the at least one viable lane change segments that have been extracted.

In the vehicle control method of the tenth aspect, the traffic information for the travel route from the current position to the limit point is acquired in cases in which there is a need to change lanes at or before the specific limit point when the vehicle configured to perform driving assistance is travelling toward the destination. Note that "limit point" and "traffic information" should be understood as stated previously.

The easiness level of lane change is then computed in the plural segments on the travel route from the current position to the limit point based on the traffic information. The easiness level is an easiness level for a lane change by driving assistance. Furthermore, segments for which the easiness level is the reference level or higher are extracted as "viable lane change segments". Then in cases in which at least one of the "viable lane change segments" has been extracted, the lane change by driving assistance is executed in one or other segment of the "viable lane change segments" that have been extracted. The lane change is thereby executed in the "viable lane change segment" extracted in advance in cases in which there is a need to perform lane change at or before the specific limit point on the route to the destination. Namely, a situation can be avoided in which a lane change by driving assistance is unable to be performed owing to traffic conditions from when the vehicle has neared the limit point.

A non-transitory storage medium storing a vehicle control program of an eleventh aspect causes a computer to execute processing employed in a vehicle configured to perform driving assistance. The processing includes, in cases in which there is a need to change lanes at or before a specific limit point on a route to a destination, acquiring traffic information for a travel route from a current position to the limit point, computing an easiness level of lane change by driving assistance in plural segments on the travel route based on the traffic information, extracting any segments for which the easiness level is a reference level or higher as viable lane change segments, and, in cases in which at least one of the viable lane change segments has been extracted, executing a lane change in any one of the at least one viable lane change segments that have been extracted.

In the non-transitory storage medium storing the vehicle control program of the eleventh aspect, the traffic information for the travel route from a current position to the limit point is acquired in cases in which there is a need to change lanes at or before the specific limit point when the vehicle configured to perform driving assistance is traveling toward the destination. Note that "limit point" and "traffic information" should be understood as stated previously.

Moreover, based on the traffic information, the easiness level of lane change is computed for plural segments on the travel route from the current position to the limit point. The easiness level is an easiness level for a lane change by driving assistance. Furthermore, any segments having an easiness level of the reference level or higher are extracted as "viable lane change segments". In cases in which at least one of the "viable lane change segments has been extracted", a lane change by driving assistance is executed in one or other segment of the "viable lane change segments" that have been extracted. This thereby means that lane change is executed in the "viable lane change segment" extracted in advance in cases in which a lane change is needed at or before the specific limit point on the route to the destination. Namely, a situation can be avoided in which a lane change by driving assistance is unable to be performed owing to traffic conditions from when the vehicle has neared the limit point.

The vehicle control device of the first aspect exhibits the excellent advantageous effect of enabling lane change by driving assistance to be executed smoothly.

The vehicle control device of the second aspect exhibits the excellent advantageous effect of enabling a situation to be avoided in which a traffic jam occurs in the lane change destination lane and a lane change is unable to be performed by the limit point.

The vehicle control device of the third aspect exhibits the excellent advantageous effect of enabling the occupant to be aware of the viable lane change segments.

The vehicle control device of the fourth aspect exhibits the excellent advantageous effect of enabling the occupant to be even more easily aware of the viable lane change segments.

The vehicle control device of the fifth aspect exhibits the excellent advantageous effect of enabling the lane change to be executed in the segment desired by the occupant.

The vehicle control device of the sixth aspect exhibits the excellent advantageous effect of enabling the occupant to be provided with information to prompt the decision-making of the occupant.

The vehicle control device of the seventh aspect exhibits the excellent advantageous effect of improving the safety and certainty of a lane change.

The vehicle control device of the eighth aspect exhibits the excellent advantageous effect of enabling the occupant to be pre-warned of a lane change.

The vehicle control device of the ninth aspect exhibits the excellent advantageous effect of enabling a situation to be avoided in which lane change is executed in a segment not intended by the occupant.

The vehicle control method of the tenth aspect exhibits the excellent advantageous effect of enabling lane change by driving assistance to be executed smoothly.

The non-transitory storage medium storing the vehicle control program of the eleventh aspect exhibits the excellent advantageous effect of enabling lane change by driving assistance to be executed smoothly.

BRIEF DESCRIPTION OF THE DRAWINGS

An exemplary embodiment of the present disclosure will be described in detail based on the following figures, wherein.

DETAILED DESCRIPTION

Description follows regarding an electronic control unit (ECU) 10 serving as a vehicle control device according to an exemplary embodiment of the present disclosure, with reference to FIG. 1 to FIG. 9. The ECU 10 is installed at a vehicle 12 illustrated in FIG. 1. The vehicle 12 is configured so as to be able to switch between autonomous driving and manual driving, and is configured capable of driving assistance such as lane change or the like. Hereafter, the vehicle 12 will be called "ego-vehicle 12".

Ego-Vehicle 12 Configuration

Figure 1:
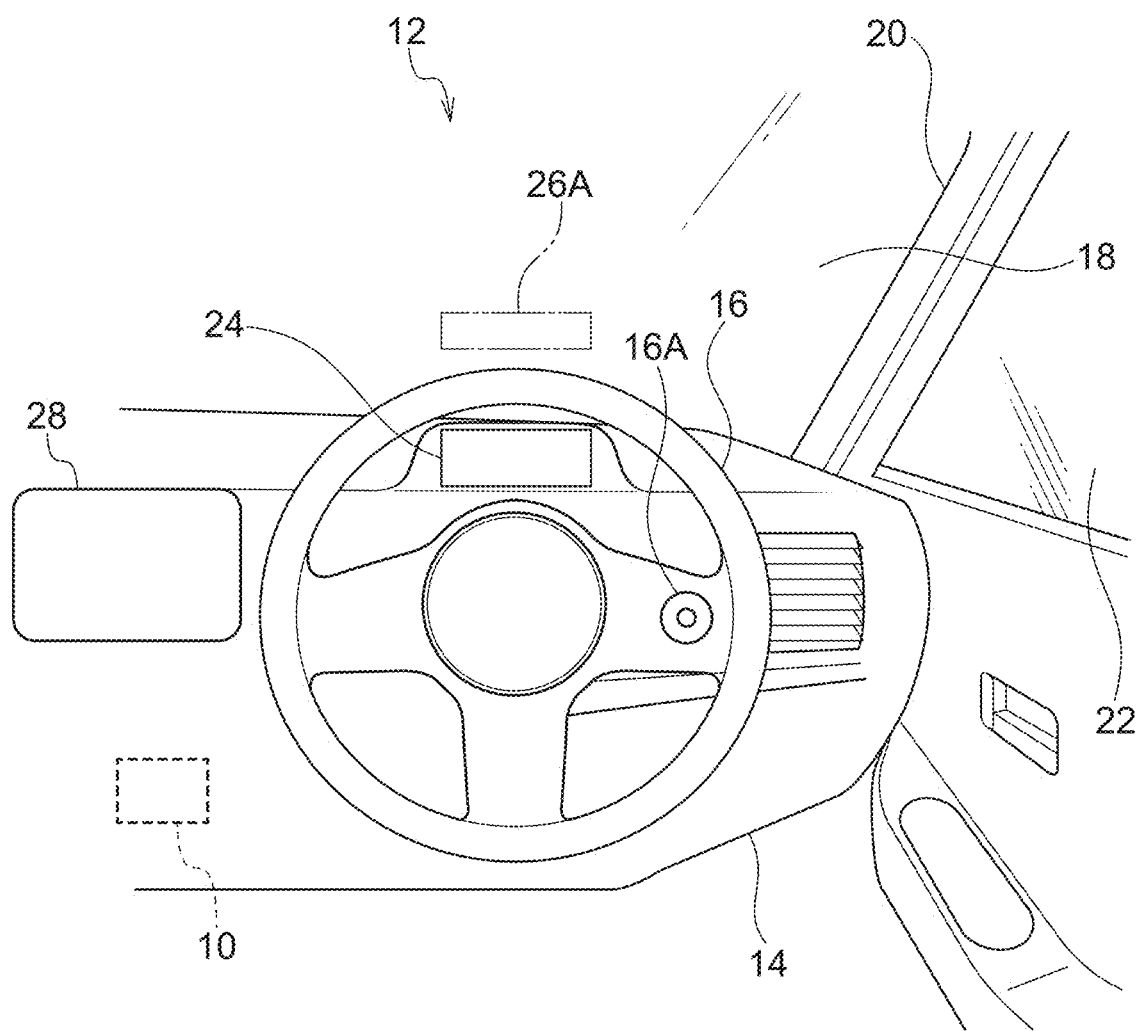
FIG. 1 is a perspective view illustrating a state looking at a vehicle cabin front section from a vehicle rear side in a vehicle equipped with an ECU serving as a vehicle control device according to an exemplary embodiment.

As illustrated in FIG. 1, an instrument panel 14 is provided to a front section in a vehicle cabin of the ego-vehicle 12. The instrument panel 14 extends in a vehicle width direction, and a steering wheel 16 is provided at a vehicle right side of the instrument panel 14. Namely, as an example of the present exemplary embodiment, the ego-vehicle 12 is a right hand drive vehicle with the steering wheel 16 provided on the right side, and a non-illustrated driver's seat is arranged at a right side of the interior of the vehicle cabin. The steering wheel 16 is provided with a steering switch 16A serving as a first input section operable by the occupant.

The instrument panel 14 described above is arranged at a vehicle lower side of a windshield glass 18. The windshield glass 18 is inclined with a downward sloping gradient toward the vehicle front side, and partitions between the vehicle cabin interior and the vehicle cabin exterior.

A vehicle right side end portion of the windshield glass 18 is fixed to a front pillar 20 on the vehicle right side. The front pillar 20 extends in a vehicle height direction, with the windshield glass 18 fixed to a vehicle width direction inside end portion of the front pillar 20. A front side-widow 22 is arranged at a vehicle rear side of the front pillar 20. Note that a vehicle left side end portion of the windshield glass 18 is fixed to a non-illustrated vehicle left side front pillar.

A meter display 24 serving as a first display section is provided at a vehicle front side of the driver's seat to an upper portion of the instrument panel 14. The meter display 24 is provided at a position entering a field of view of the occupant of the driver's seat of the ego-vehicle 12 (hereinafter simply referred to as "occupant") in a state in which a gaze of the occupant is directed toward the vehicle front side.

A head-up display (see FIG. 2, omitted from illustration in FIG. 1) 26 serving as a second display section is provided at the vehicle front side of the driver's seat to an upper portion of the instrument panel 14. The head-up display (referred to as "HUD" below) 26 is configured so as to be able to project an image onto a display area 26A set in a lower portion of the windshield glass 18 at the vehicle front side of the driver's seat. The HUD 26 is able to display an image superimposed on a forward scene viewed by the occupant of the ego-vehicle 12 through the windshield glass 18.

Furthermore, a panel display 28 serving as a third display section is provided to an upper portion of the instrument panel 14, between the driver's seat and the front passenger seat. The panel display 28 is a configuration element of the navigation system 36 (see FIG. 2), and displays various information such as map information, position information of the ego-vehicle 12, traffic information, and the like. Moreover, as an example, the panel display is capable of touch operation and voice actuated operation by an occupant 28, and includes a function as a second input section. Note that the panel display 28 may lack the function as the input section and be equipped with the function as the display section alone.

Onboard System 30 Configuration

Figure 2:
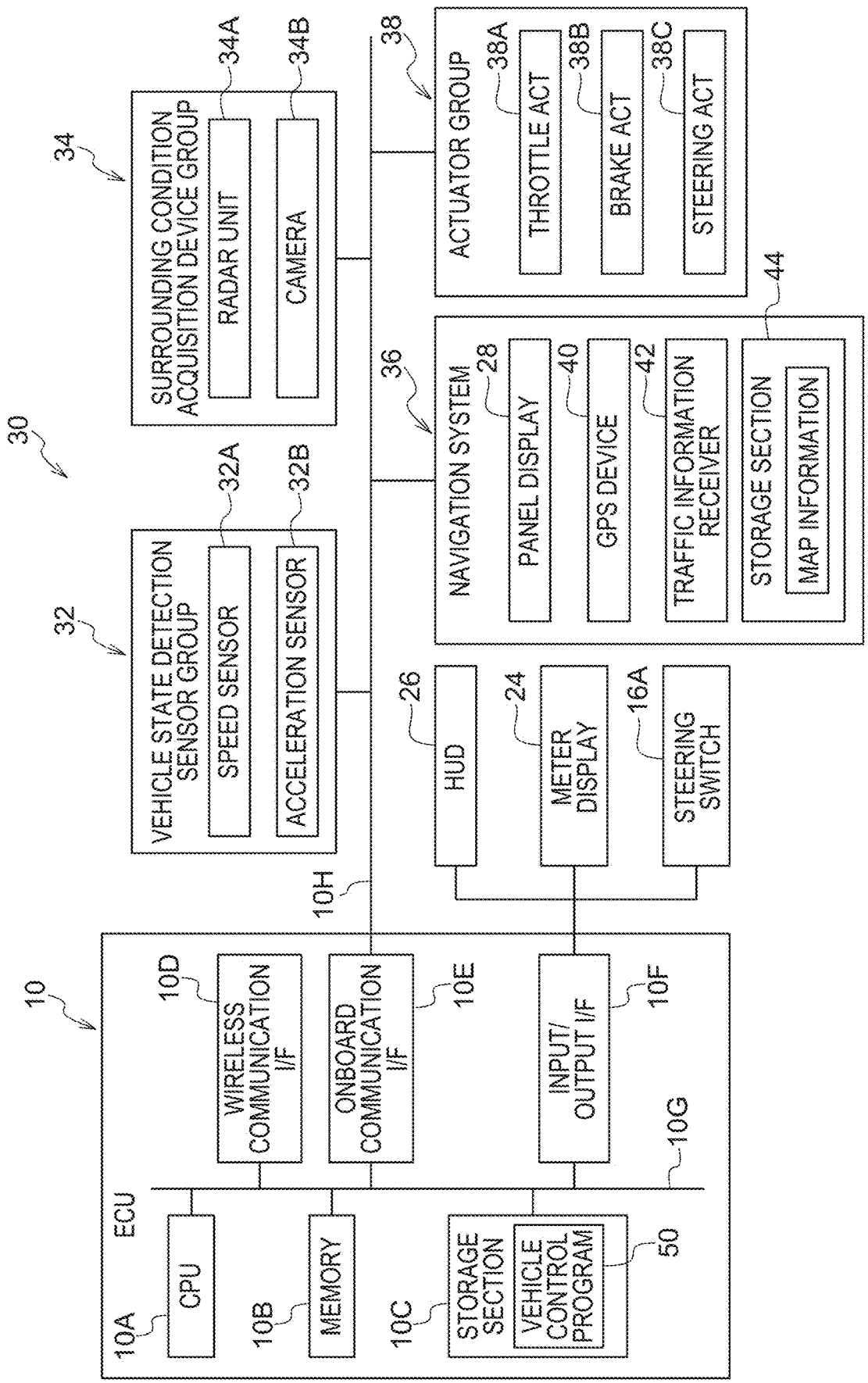
FIG. 2 is a block diagram illustrating part of a hardware configuration of an onboard system configured including the ECU illustrated in FIG. 1.

FIG. 2 is a block diagram illustrating a configuration of an onboard system 30 installed to the ego-vehicle 12. The onboard system 30 is configured including the ECU 10, a vehicle state detection sensor group 32 that acquires information related to a state of the ego-vehicle 12, a surrounding condition acquisition device group 34 that acquires information related to a surrounding condition of the ego-vehicle 12, a navigation system 36, and an actuator group 38. Note that only part of the onboard system 30 is illustrated in FIG. 2.

The ECU 10 is configured including a central processing unit (CPU) 10A, memory 10B such as read only memory (ROM) and random access memory (RAM), a non-transitory storage section 10C such as a hard disk drive (HDD) or a solid state drive (SSD), a wireless communication interface (I/F) 10D, an onboard communication interface I/F 10E, and an input/output I/F 10F. The CPU 10A, the memory JOB, the storage section 10C, the wireless communication/F 10D, the onboard communication I/F 10E, and the input/output I/F 10F are connected together through an internal bus 10G so as to be able to communicate with each other.

The CPU 10A is a central processing unit that executes various programs and controls each section. Namely, the CPU 10A reads a program from the ROM of the memory 10B or from the storage section 10C, and executes the program using the RAM of the memory 10B as workspace. The CPU 10A controls each of the above configurations and performs various computational processing according to the program.

A vehicle control program 50 is stored in the storage section 10C. The ECU 10 performs a lane change of the ego-vehicle 12 under driving assistance by the CPU 10A executing the vehicle control program 50.

The wireless communication I/F 10D performs at least one out of vehicle-to-vehicle communication with other-vehicles, or vehicle-to-infrastructure communication with road infrastructure.

The onboard communication I/F 10E is an interface for connection to the vehicle state detection sensor group 32, the surrounding condition acquisition device group 34, the navigation system 36, and the actuator group 38. The vehicle state detection sensor group 32, the surrounding condition acquisition device group 34, the navigation system 36, and the actuator group 38 are each connected to an external bus 10H that is connected to the onboard communication I/F 10E. A communication standard by CAN protocol is employed in the onboard communication I/F 10E.

The meter display 24 serving as the first display section, the HUD 26 serving as the second display section, and the steering switch 16A serving as the first input section, are each are electrically connected to the input/output I/F 10F.

The vehicle state detection sensor group 32 is configured including a speed sensor 32A to detect a speed of the ego-vehicle 12 and an acceleration sensor 32B to detect acceleration imparted to the ego-vehicle 12, with these serving as plural sensors for acquiring a state of the ego-vehicle 12.

The surrounding condition acquisition device group 34 is configured including a radar unit 34A and a camera 34B. The radar unit 34A includes plural radar devices having different detection ranges to each other, and detects surrounding targets such as pedestrians, other-vehicles, and the like present in the surroundings of the ego-vehicle 12 as point cloud information, and acquires relative positions and relative speeds between the detected surrounding targets and the ego-vehicle 12. The radar unit 34A is inbuilt with a processing device for processing detection results of surrounding targets. Based on changes in the relative position, relative speed, and the like of individual surrounding targets contained in plural most recent detections results, the processing device removes noise and roadside objects such as guard rails and the like from monitoring objects, and performs tracking monitoring to track particular targets, such as pedestrians, other-vehicles, and the like, as monitoring target objects. The radar unit 34A then outputs information such as the relative position and relative speed to each of the individual monitoring target objects. The camera 34B images the surroundings of the ego-vehicle 12 using plural cameras and outputs the captured images.

When the ego-vehicle 12 is attempting a lane change, the ECU 10 determines whether or not an immediate lane change is viable based on information such as about the conditions of other-vehicles in the lane change destination lane as acquired by the surrounding condition acquisition device group 34. For example, the ECU 10 acquires information such as an inter-vehicle distance between other-vehicles present in the lane change destination lane and information such as relative speed or the like between other-vehicles present in the lane change destination lane and the ego-vehicle 12, combines these information and performs the determination described above thereon. Details about other functions of the ECU 10 are described later.

The navigation system 36 is configured including the panel display 28, a global positioning system (GPS) device 40 that acquires position information of the ego-vehicle 12, a traffic information receiver 42 to acquire traffic information about the target destination, and a storage section 44 to store the map information.

The GPS device 40 includes a non-illustrated antennae to receive signals from plural GPS satellites. The GPS device 40 receives the GPS signals from the plural GPS satellites and measures the current position of the ego-vehicle 12.

The navigation system 36 displays the current position of the ego-vehicle 12 on a map on the panel display 28 based on the map information stored in the storage section 44, and the position information of the ego-vehicle 12 as acquired from the GPS device 40. The navigation system 36 also guides a route to a destination D (see FIG. 8). Furthermore, traffic information related to the journey of the ego-vehicle 12 is also displayed on the panel display 28 based on the traffic information acquired by the traffic information receiver 42.

The actuator group 38 is configured including a throttle actuator (ACT) 38A to change the degree of opening of the throttle of the ego-vehicle 12, a brake ACT 38B to change the braking force generated by brakes of the ego-vehicle 12, and a steering ACT 38C to change an amount of steering by a steering device of the ego-vehicle 12.

The CPU 10A of the ECU 10 determines a condition based on information obtained from the vehicle state detection sensor group 32, the surrounding condition acquisition device group 34, the navigation system 36, and the steering switch 16A, performs display on at least one display section from out of the HUD 26, the meter display 24, or the panel display 28, and controls the actuator group 38 so as to execute a lane change.

ECU 10 Functional Configuration

Figure 3:
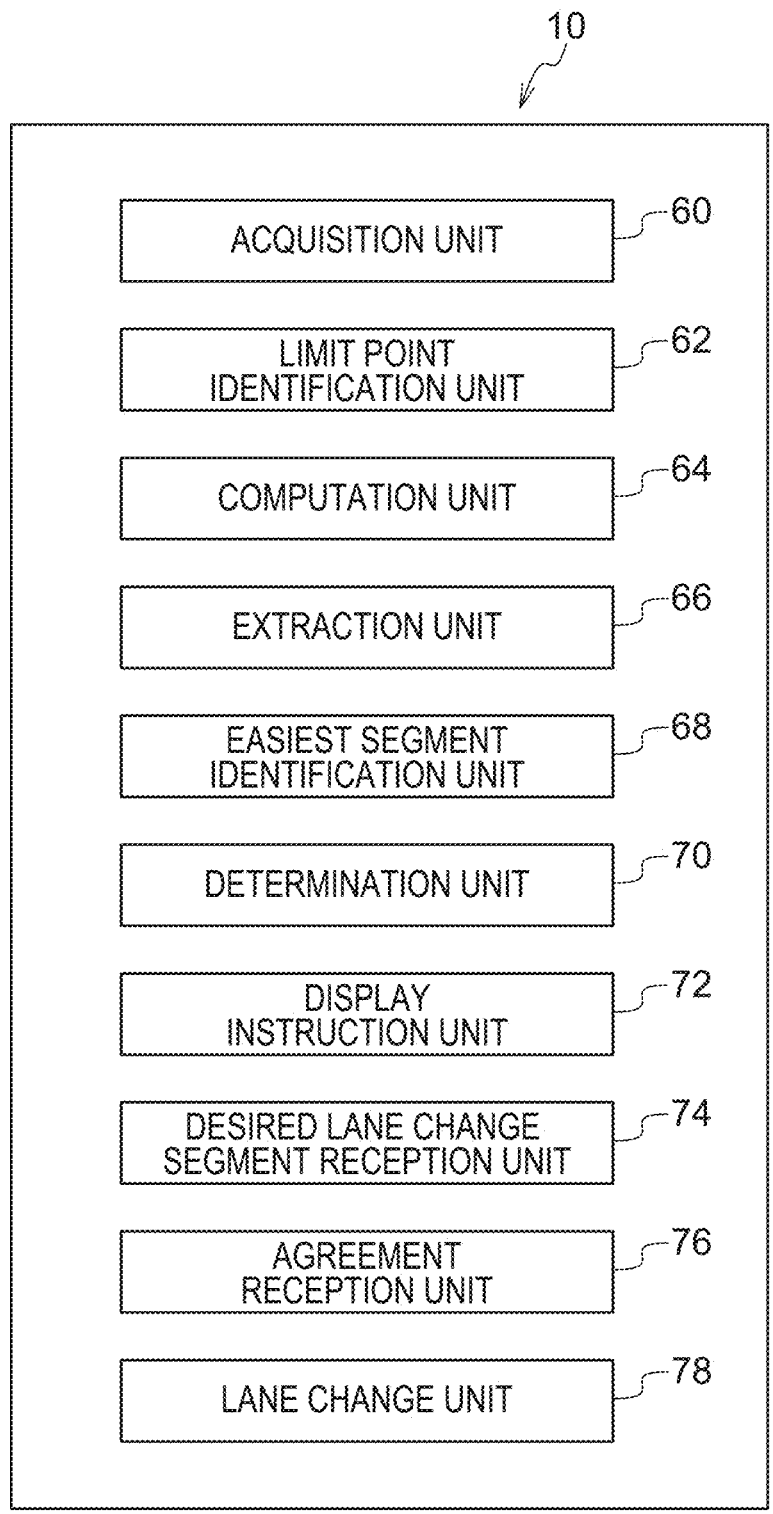
FIG. 3 is a block diagram illustrating a functional configuration of the ECU illustrated in FIG. 2.

As illustrated in FIG. 3, the ECU 10 functions as an acquisition unit 60, a limit point identification section 62, a computation unit 64, an extraction unit 66, an easiest segment identification unit 68, a determination section 70, a display instruction unit 72, a desired lane change segment reception unit 74, an agreement reception unit 76, and a lane change unit 78 by the CPU 10A executing the vehicle control program 50. Description follows regarding each of the functions.

The acquisition unit 60 includes functions to acquire information related to a state of the ego-vehicle 12 from the vehicle state detection sensor group 32, and to acquire information related to surrounding conditions of the ego-vehicle 12 from the surrounding condition acquisition device group 34. Furthermore, the acquisition unit 60 also includes a function to acquire, from the navigation system 36, position information of the destination D (see FIG. 8), position information of the ego-vehicle 12 (see FIG. 8), and map information and traffic information up to the destination D. Reference here to "traffic information" includes all sorts of road traffic information related to the ease of a lane change by the ego-vehicle 12, such as traffic jam information, predicted traffic jam information, congestion information, traffic restriction information, accident information, roadwork information, and the like.

Figure 8:
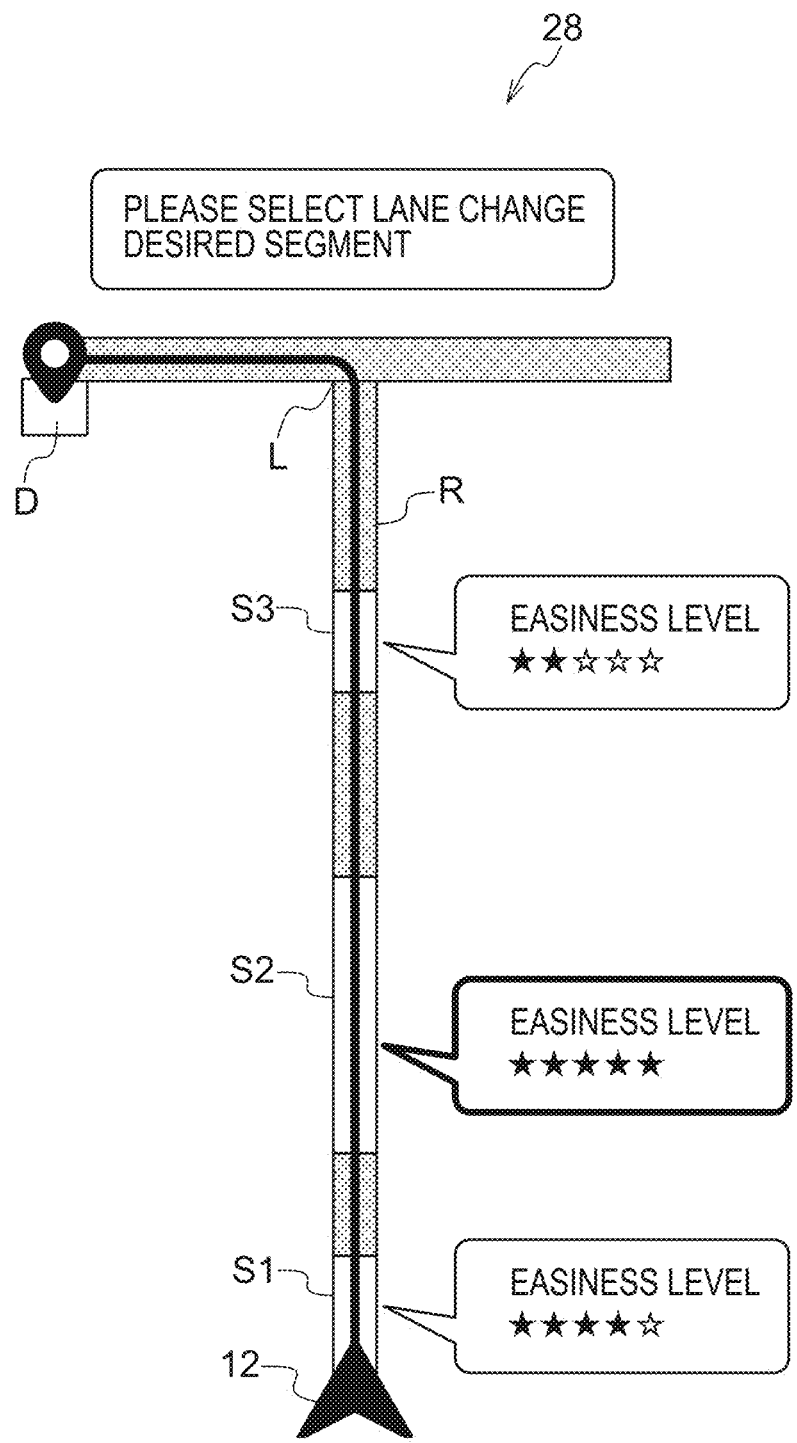
FIG. 8 is an example of an image displayed on the panel display illustrated in FIG. 1 in the second example processing illustrated in FIG. 7.

The limit point identification section 62 includes a function to, based on the various information acquired by the acquisition unit 60, identify a limit point L in cases in which there is a need to perform a lane change before the specific limit point L (see FIG. 8) on the route to the destination D (see FIG. 8). Reference here to the "limit point" means all sorts of locations that are locations by which point the lane change needs to be performed, such as crossroads and branch points, exits/entrances to expressways, rest facilities such as service areas and parking areas, and the destination itself.

The computation unit 64 includes a function to, based on the traffic information acquired by the acquisition unit 60, compute an easiness level of lane change at plural segments on a travel route R (see FIG. 8) from the current position of the ego-vehicle 12, namely the present location, to the limit point L. This easiness level of lane change is an easiness level for lane change by driving assistance.

As an example, based on the traffic information, the computation unit 64 predicts times for the ego-vehicle 12 to arrive at each segment on the travel route R, determines whether or not each of the segments will be passable and how congested each of the segments will be at these anticipated arrival times, and based on these factors computes an evaluation of easiness level in 5 ranks. For example, a segment where lane change is not allowed according to traffic restrictions is evaluated as easiness level 0, a segment where lane change is anticipated to be difficult owing to a traffic jam is evaluated as easiness level 1, a segment where some congestion is anticipated but lane change viable is evaluated as easiness level 2, and viable lane change segments are evaluated as easiness level 3 to easiness level 5 in sequence according to the congestion condition anticipated. Note that the computation method for easiness level given above is merely an example thereof, and there is no limitation thereto. The easiness levels are also not limited to 5 ranks and may, for example, be evaluated as percentages in which a situation in which lane change is viable with absolutely no obstruction thereto from traffic restrictions, predicted traffic jams, or the like is evaluated as 100%. Moreover for example, evaluation may be in two ranks based simply on predicted traffic jam information, with a segment in which a traffic jam is predicted evaluated as easiness level 0, and a segment in which a traffic jam is not predicted evaluated as easiness level 1.

The extraction unit 66 includes a function to extract as "viable lane change segments" any segments having an easiness level as computed by the computation unit 64 of a reference level or higher. As an example, the extraction unit 66 of the present exemplary embodiment extracts any segments having an easiness level of 2 or higher in the above 5 rank evaluation as "viable lane change segments".

The easiest segment identification unit 68 includes a function to, in cases in which plural "viable lane change segments" have been extracted by the extraction unit 66, identify the "easiest viable lane change segment" from out of the plural "viable lane change segments" based on the easiness levels as computed by the computation unit 64.

The desired lane change segment reception unit 74 includes a function to, in cases in which plural "viable lane change segments" have been extracted by the extraction unit 66, receive information related to a segment among plural viable lane change segments at which the occupant desires to make a lane change from at least one input section out of the steering switch 16A and the panel display 28 provided in the vehicle cabin.

The agreement reception unit 76 includes, in first example processing as described later, a function to receive information related to whether or not the occupant has agreed to a proposal of statement "Changing lanes in advance owing to traffic conditions" from at least one input section of the steering switch 16A or the panel display 28. Note that the input section is not limited to the steering switch 16A and the panel display 28, and may be any device provided in the vehicle cabin configured for input by the occupant. For example, the input section may be a remote controller and joystick.

The display instruction unit 72 includes a function to, in cases in which not even one "viable lane change segment" was extracted by the extraction unit 66, display a proposal for a route change or a manual lane change on at least one display section from out of the HUD 26, the meter display 24, and the panel display 28.

Figure 6:
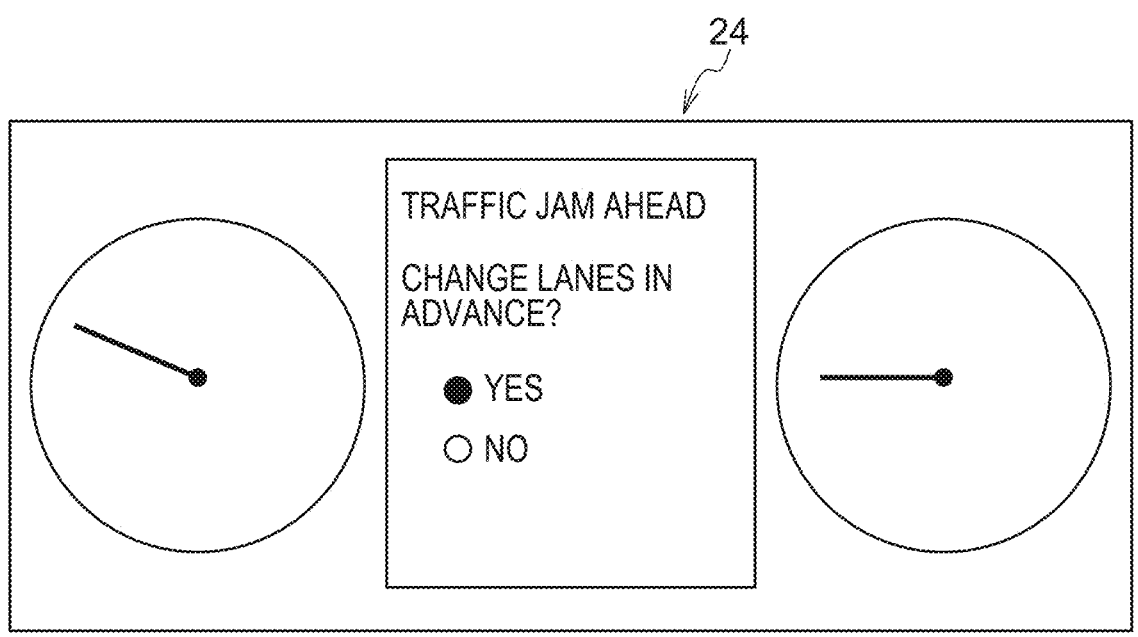
FIG. 6 is an example of an image displayed on the meter display illustrated in FIG. 1 in the first example processing illustrated in FIG. 5.
Figure 9:
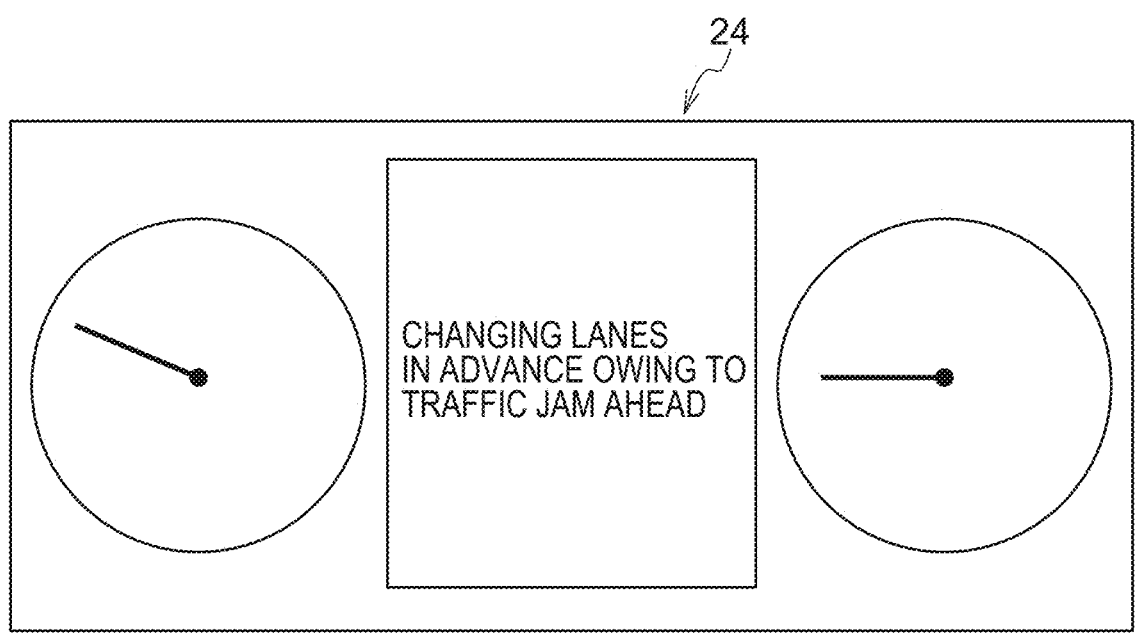
FIG. 9 is an example of an image displayed on the meter display illustrated in FIG. 1 in the second example processing illustrated in FIG. 7.

Moreover, the display instruction unit 72 includes a function to, in cases in which the "easiest viable lane change segment" is remote from the limit point L (see FIG. 8) by a predetermined specific distance or greater, display a display or proposal stating that a lane change will be performed in advance owing to traffic conditions on at least one display section from out of the HUD 26, the meter display 24, and the panel display 28. FIG. 6 illustrates, as an example, a case in which an image of a proposal "Traffic jam ahead. Change lanes in advance?" is displayed on the meter display 24. A configuration is adopted in which the occupant is able to select "YES" or "NO" in response to such display using, for example, the steering switch 16A, such that the agreement reception unit 76 receives the selection of the occupant. Moreover, FIG. 9 illustrates, as another example, an image displayed with text of "Changing lanes in advance owing to traffic jam ahead" on the meter display 24.

Furthermore, the display instruction unit 72 includes a function to display plural extracted "viable lane change segments" together with their easiness levels as computed by the computation unit 64 on at least one display section from out of the HUD 26, the meter display 24, and the panel display 28. As an example, as illustrated in FIG. 8, the display instruction unit 72 displays a segment S1, a segment S2, and a segment S3 as "viable lane change segments" on the map illustrating the travel route R to the limit point L, together with their easiness levels, on the panel display 28. In FIG. 8, the road displayed with shading is where traffic jams are anticipated at the respective arrival times of the ego-vehicle 12, and the segment S1, the segment S2, and the segment S3 extracted by the extraction unit 66 are displayed on the map as "viable lane change segments". The easiness level of lane change in the segment S1 is level 4, the easiness level of lane change in the segment S2 is level 5, the easiness level of lane change in the segment S3 is level 2, and these are each displayed as ranks by infilling five stars. Note that the method of displaying the easiness levels is not limited thereto and, for example, the easiness level may be displayed by a bar graph or by different colors. Moreover, the numerical values of the computed easiness levels may be displayed directly. Furthermore, for example, verbal expressions such as "Extremely easy", "Quite difficult", and the like may be displayed.

The determination section 70 includes a function to determine whether or not at least one "viable lane change segment" has been extracted by the extraction unit 66. Moreover, the determination section 70 includes a function to determine whether one or plural "viable lane change segments" were extracted by the extraction unit 66.

Furthermore, the determination section 70 includes a function to determine whether or not the ego-vehicle 12 has arrived at the "easiest viable lane change segment" as identified by the easiest segment identification unit 68. Moreover, the determination section 70 includes a function to determine whether or not this "easiest viable lane change segment" is a specific distance or greater away from the limit point.

Furthermore, in first example processing described later, the determination section 70 includes a function to determine whether or not the occupant has agreed with the proposal stating that lane change will be performed in advance owing to traffic conditions.

Moreover, the determination section 70 includes a function to determine whether or not an occupant selection has been received regarding a "lane change desired segment" where the occupant desires to make a lane change.

Furthermore, the determination section 70 includes a function to determine whether or not the ego-vehicle 12 has arrived at the lane change desired segment.

The lane change unit 78 includes a function to, in cases in which only one "viable lane change segment" has been extracted by the extraction unit 66, check surrounding conditions when the ego-vehicle 12 has arrived at this "viable lane change segment" and execute lane change automatically.

Moreover, the lane change unit 78 includes a function to, in cases in which the "easiest viable lane change segment" as identified by the easiest segment identification unit 68 is less than a specific distance from the limit point, namely, in cases in which the "easiest viable lane change segment" is near to the limit point, check surrounding conditions when the ego-vehicle 12 has arrived at the "easiest viable lane change segment" and execute lane change automatically.

Furthermore, in the first example processing described later, the lane change unit 78 includes a function to, in cases in which the occupant has agreed with the proposal stating that lane change will be performed in advance owing to traffic conditions, check surrounding conditions when the ego-vehicle 12 has arrived at the "easiest viable lane change segment" and execute lane change automatically.

Furthermore, the lane change unit 78 includes a function to, in cases in which an occupant selection has not been received regarding a lane change desired segment, to check surrounding conditions when the ego-vehicle 12 has arrived at the "easiest viable lane change segment" and execute lane change automatically. Moreover, the lane change unit 78 also includes a function to, in cases in which an occupant selection has been received regarding a lane change desired segment, to check surrounding conditions when the ego-vehicle 12 has arrived at the lane change desired segment and execute lane change automatically.

First Example Processing Flow

Figure 4:
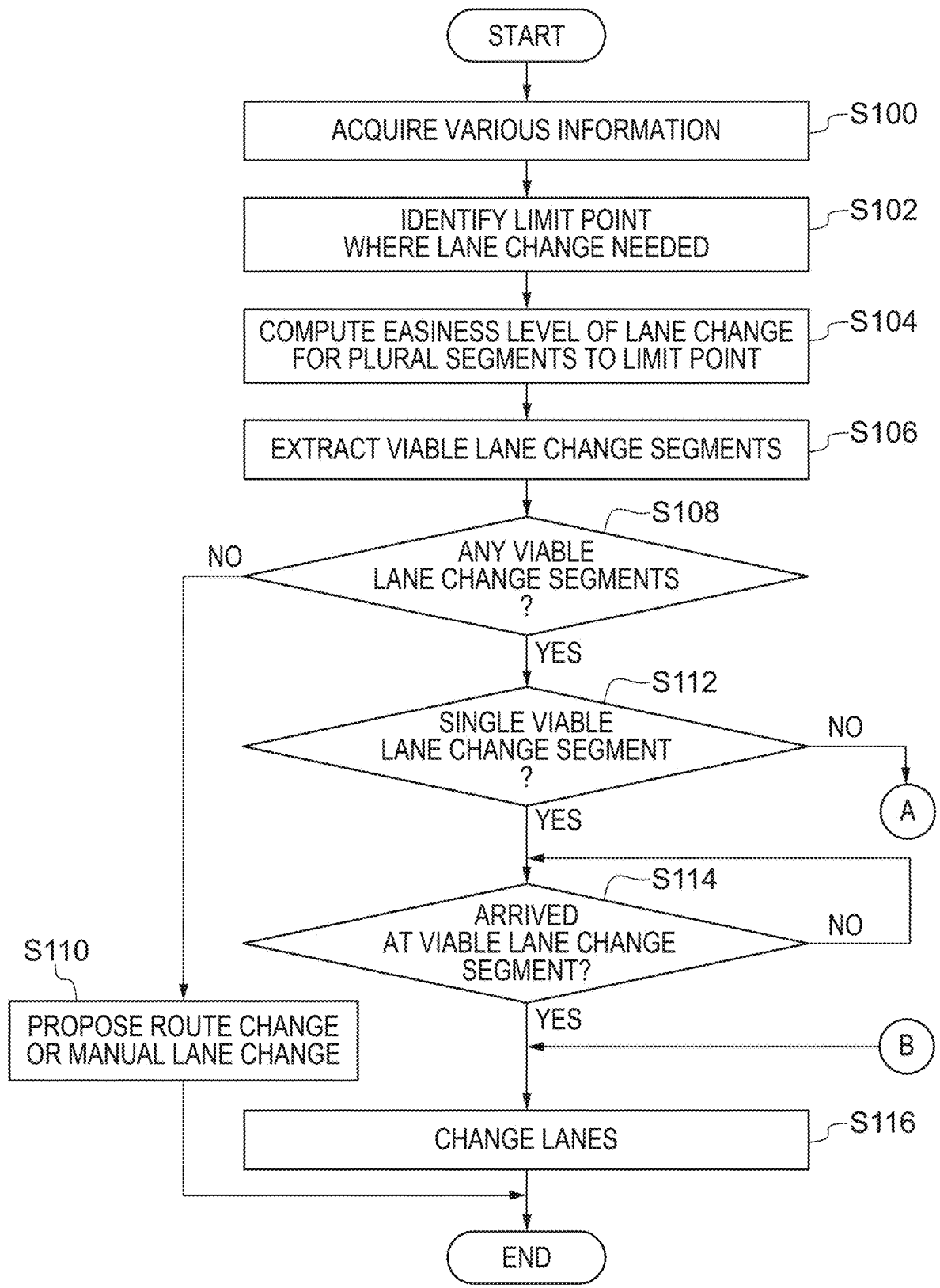
FIG. 4 is a flowchart illustrating an example of a flow of processing performed in the ECU illustrated in FIG. 2.
Figure 5:
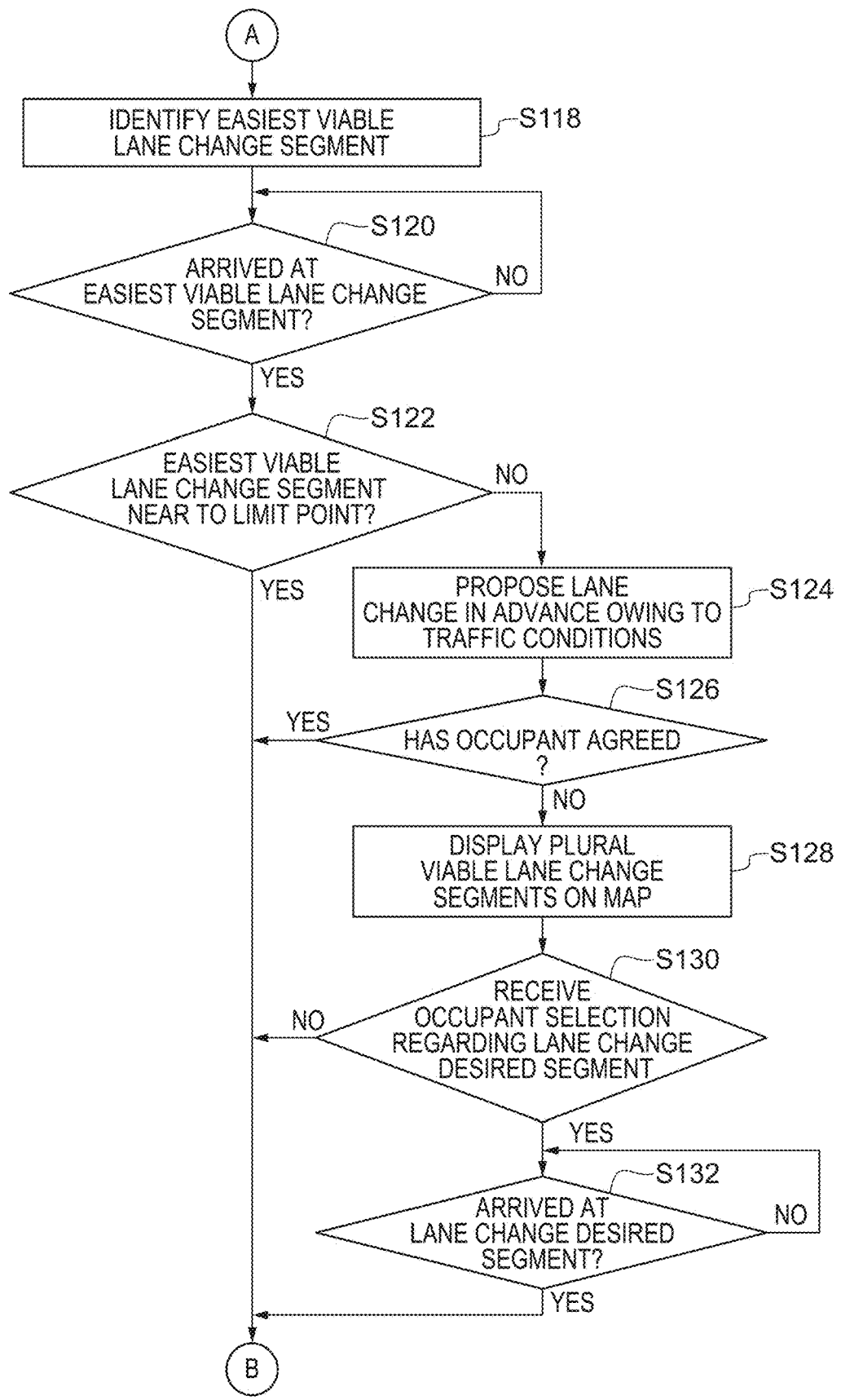
FIG. 5 is a flowchart illustrating a first example of a flow of processing from A of FIG. 4 onward.

Next description follows regarding a first example of processing flow executed in the ECU 10, with reference to FIG. 4 to FIG. 6. The processing is executed at a departure point, and thereafter is executed each time a limit point has been passed.

At step S100 of FIG. 4, the CPU 10A of the ECU 10 acquires, from the navigation system 36, position information of the destination D, position information of the ego-vehicle 12, and map information and traffic information up to the destination D.

At step S102, based on each information acquired by the acquisition unit 60, the CPU 10A of the ECU 10 identifies the limit point L in cases in which there is a need to perform a lane change before the specific limit point L on the route to the destination D.

At step S104, based on the traffic information acquired at step S100, the CPU 10A of the ECU 10 computes the easiness level of a lane change in each of plural segments on the travel route R from the current position of the ego-vehicle 12 to the limit point L.

At step S106, the CPU 10A of the ECU 10 extracts any segments for which the easiness level is the reference level or higher as "viable lane change segments".

At step S108, the CPU 10A of the ECU 10 determines whether or not at least one "viable lane change segment" has been extracted.

In cases in which determination has been made at step S108 that not even one "viable lane change segment" was extracted, at step S110 the CPU 10A of the ECU 10 displays a display of a proposal to change route or to perform lane change manually on at least one display section from out of the HUD 26, the meter display 24, and the panel display 28, and then ends processing.

However, in cases in which determination has been made at step S108 that at least one "viable lane change segment" has been extracted, at step S112, the CPU 10A of the ECU 10 determines whether one or plural "viable lane change segments" were extracted.

In cases in which determination has been made at step S112 that one "viable lane change segment" has been extracted, at step S114 the CPU 10A of the ECU 10 determines whether or not the ego-vehicle 12 has arrived at this "viable lane change segment".

In cases in which determination has been made at step S114 that the ego-vehicle 12 has arrived at the "viable lane change segment", at step S116 the CPU 10A of the ECU 10 executes lane change according to the surrounding conditions and ends processing. In cases in which determination has been made at step S114 that the ego-vehicle 12 has not arrived at the "viable lane change segment", the processing at step S114 is executed again after a specific period of time has elapsed.

In cases in which determination has been made at step S112 that there are plural "viable lane change segments" extracted, at step S118 of FIG. 5, the CPU 10A of the ECU 10 identifies the "easiest viable lane change segment" from out of the plural viable lane change segments based on the computed easiness levels thereof.

At step S120 the CPU 10A of the ECU 10 determines whether or not the ego-vehicle 12 has arrived at the "easiest viable lane change segment".

Then in cases in which determination has been made at step S120 that the ego-vehicle 12 has arrived at the "easiest viable lane change segment", at step S122 the CPU 10A of the ECU 10 determines whether or not the "easiest viable lane change segment" is remote from the limit point by the specific distance or greater. However, in cases in which determination has been made at step S120 that the ego-vehicle 12 has not arrived at the "easiest viable lane change segment", the CPU 10A of the ECU 10 executes the processing of step S120 again after the specific period of time has elapsed.

In cases in which determination has been made at step S122 that the "easiest viable lane change segment" is not remote from the limit point L by the specific distance or greater, namely cases in which the "easiest viable lane change segment" is near to the limit point L, at step S116 of FIG. 4 the CPU 10A of the ECU 10 executes lane change according to surrounding conditions and then ends processing.

However, in cases in which determination has been made at step S122 of FIG. 5 that the "easiest viable lane change segment" is remote from the limit point L by the specific distance or greater, at step S124 the CPU 10A of the ECU 10 displays a proposal stating that lane change will be performed in advance owing to traffic conditions on the meter display 24 as illustrated in FIG. 6.

At step S126 illustrated in FIG. 5, the CPU 10A of the ECU 10 determines whether or not the occupant has agreed to the above proposal.

In cases in which determination has been made at step S126 that the occupant has agreed, at step S116 of FIG. 4 the CPU 10A of the ECU 10 executes lane change according to surrounding conditions and then ends processing.

However, in cases in which determination has been made at step S126 that the occupant has not agreed, at step S128 the CPU 10A of the ECU 10 displays plural "viable lane change segments" S1, S2, and S3 (see FIG. 8), together with their easiness levels, on the panel display 28.

At step S130 the CPU 10A of the ECU 10 determines whether or not an occupant selection regarding the lane change desired segment has been received.

In cases in which determination has been made at step S130 that an occupant selection has not been received within a specific period of time, at step S116 of FIG. 4, the CPU 10A of the ECU 10 executes lane change according to surrounding conditions and then ends processing. Namely, lane change is executed at a timing when lane change is next viable in both cases in which the occupant did not prefer a lane change at the "easiest viable lane change segment" and also in cases in which the occupant has not input a lane change desired segment within the specific period of time.

In cases in which determination has been made at step S130 of FIG. 5 that the occupant selection has been received, at step S132 the CPU 10A of the ECU 10 determines whether or not the ego-vehicle 12 has arrived at the lane change desired segment.

In cases in which determination has been made at step S132 that the ego-vehicle 12 has arrived at the lane change desired segment, at step S116 of FIG. 4 the CPU 10A of the ECU 10 executes lane change according to surrounding conditions and then ends processing. However, in cases in which determination has been made at step S132 that the ego-vehicle 12 has not arrived at the lane change desired segment, the CPU 10A of the ECU 10 executes the processing of step S132 again after the specific period of time has elapsed.

Second Example Processing Flow

Next description follows regarding a second example of processing flow executed in the ECU 10, with reference to FIG. 4 and FIG. 7 to FIG. 9. Similarly to the first example processing, this processing is executed at a departure point, and thereafter is executed each time a limit point has been passed The processing of step S100 to step S116 illustrated in FIG. 4 is similar to that of the first example and so explanation thereof will be omitted, however the processing from A illustrated in FIG. 4 onward will be described with reference to FIG. 7.

At step S140, the CPU 10A of the ECU 10 displays the plural "viable lane change segments" S1, S2, and S3 that have been extracted as illustrated in FIG. 8, together with their easiness levels, on the panel display 28.

At step S142, the CPU 10A of the ECU 10 determines whether or not an occupant selection regarding the lane change desired segment has been received.

In cases in which determination has been made at step S142 that an occupant selection has been received, at step S144 the CPU 10A of the ECU 10 determines whether or not the ego-vehicle 12 has arrived at the lane change desired segment.

In cases in which determination has been made at step S144 that the ego-vehicle 12 has arrived at the lane change desired segment, at step S116 of FIG. 4 the CPU 10A of the ECU 10 executes lane change according to surrounding conditions and then ends processing.

In cases in which determination has been made at step S144 that the ego-vehicle 12 has not arrived at the lane change desired segment, the CPU 10A of the ECU 10 executes the processing of step S144 again after a specific period of time has elapsed.

In cases in which determination has been made at step S142 that an occupant selection has not been received within a specific period of time, at step S146 the CPU 10A of the ECU 10 identifies the "easiest viable lane change segment". In the example illustrated in FIG. 8, the segment S2 is identified as the "easiest viable lane change segment".

At step S148, the CPU 10A of the ECU 10 determines whether or not the ego-vehicle 12 has arrived at the "easiest viable lane change segment" S2.

In cases in which determination has been made at step S148 that the ego-vehicle 12 has arrived at the "easiest viable lane change segment" S2, at step S150 the CPU 10A of the ECU 10 determines whether or not the "easiest viable lane change segment" is remote from the limit point by the specific distance or greater. In cases in which determination has been made at step S148 that the ego-vehicle 12 has not arrived at the "easiest viable lane change segment" S2, the CPU 10A of the ECU 10 executes the processing of step S148 again after the specific period of time has elapsed.

In cases in which determination has been made at step S150 that the "easiest viable lane change segment" S2 is not remote from the limit point L by the specific distance or greater, namely cases in which the "easiest viable lane change segment" S2 has been determined to be near to the limit point L, at step S116 of FIG. 4 the CPU 10A of the ECU 10 executes lane change according to surrounding conditions and then ends processing.

Figure 7:
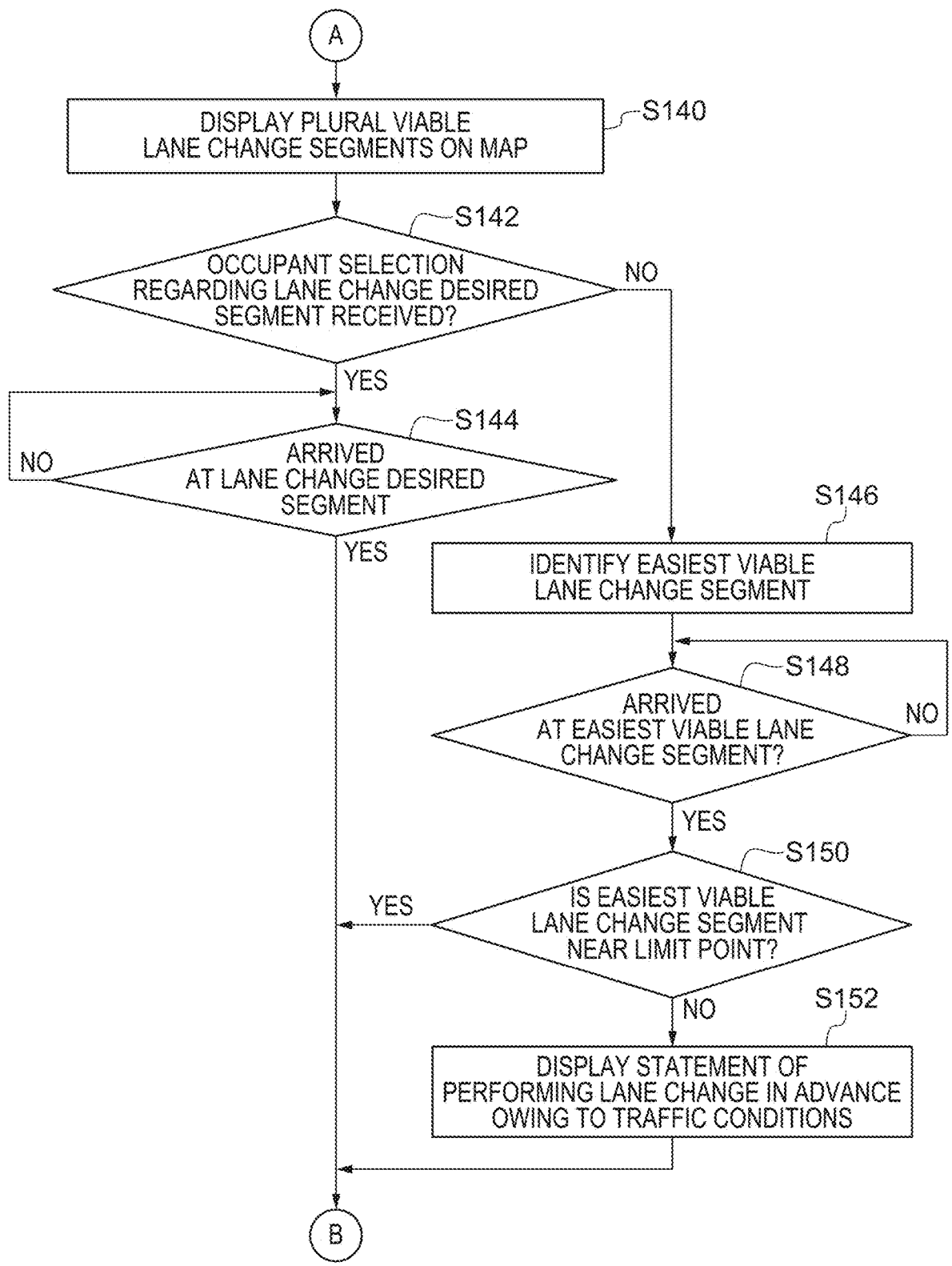
FIG. 7 is a flowchart illustrating a second example of a flow of processing from A of FIG. 4 onward.

However, in cases in which determination has been made at step S150 of FIG. 7 that the "easiest viable lane change segment" S2 is remote from the limit point L by the specific distance or greater, at step S152 the CPU 10A of the ECU 10 displays a statement that lane change will be performed in advance owing to traffic conditions on the meter display 24 as illustrated in FIG. 9, and at step S116 of FIG. 4 executes lane change according to surrounding conditions and then ends processing.

Operation and Advantageous Effects of Present Exemplary Embodiment

The ECU 10 according to the present exemplary embodiment executes a lane change at an extracted "viable lane change segment" in cases in which there is a need for a lane change at or before the specific limit point L on the route to destination D. Namely, the ECU 10 according to the present exemplary embodiment is able to avoid a situation in which a lane change by driving assistance is not able to be performed owing to traffic conditions from when the ego-vehicle 12 nears the limit point L.

In particular, due to the "viable lane change segments" S1, S2, and S3 being extracted based on the traffic conditions including predicted traffic jam information, this enables a situation to be avoided in which there is a traffic jam on the lane change destination lane and a lane change is not able to be performed before the limit point L.

Moreover, as illustrated in FIG. 8, the "viable lane change segments" S1, S2, and S3 are displayed on the panel display 28 provided in the vehicle cabin. This thereby enables the occupant to ascertain the "viable lane change segments" S1, S2, and S3 visually in advance in cases in which there is a need for a lane change before a specific limit point L on the route to the destination D. In particular, due to the "viable lane change segments" S1, S2, and S3 being displayed on the panel display 28 together with a map illustrating the travel route R, the occupant is able to directly ascertain the "viable lane change segments" S1, S2, and S3 on the map. Lane change is then able to be executed at a lane change segment desired by the occupant.

Furthermore, due to the easiness levels of each of the "viable lane change segments" S1, S2, and S3 being displayed, the occupant is able to select a desired segment for lane change after ascertaining the easiness level of lane changes for the segments.

Furthermore, in cases in which lane change is executed at the "easiest viable lane change segment" S2, lane change is executed both safely and with certainty.

Moreover, in cases in which the "easiest viable lane change segment" S2 is remote from the limit point L by the specific distance or greater, a display (second example processing: see FIG. 9) or a proposal (first example processing: see FIG. 6) that lane change will be performed in advance owing to traffic conditions is displayed by the display instruction unit 72 on the display section provided in the vehicle cabin. The occupant is accordingly able to be pre-warned of a lane change by the display stating that lane change will be performed in advance owing to traffic conditions (second example processing: see FIG. 9). This thereby enables, for example, a situation to be avoided in which the occupant is caught unawares when a lane change is performed a considerable distance in advance of the limit point where a lane change is needed. Moreover, by making the proposal to perform a lane change in advance owing to traffic conditions (first example processing: see FIG. 6), a situation can be avoided in which a lane change is executed without consultation at a segment not intended by the occupant.

Furthermore, in the first example, in cases in which the identified "easiest viable lane change segment" is near to the limit point L, then the lane change is executed as normal in the vicinity of the limit point L without special display. This thereby enables the occupant to arrive at the destination comfortably without receiving unnecessary notifications or performing unnecessary operations.

Supplementary Explanation to Above Exemplary Embodiment

In the above exemplary embodiment, an example has been described in which the predicted traffic jam information is included in the traffic information, the computation unit 64 estimates a time for the ego-vehicle 12 to arrive at each of the segments on the travel route R based on the traffic information including the predicted traffic jam information, determination is made as to whether or not each of the segments will passable, and how congested each of the segments will be, at the anticipated arrival time, and an evaluation of the easiness level is computed, however, there is no limitation thereto. For example, a computation unit may compute easiness levels only based on traffic information at the time of data acquisition.

Moreover, in the present exemplary embodiment although an example has been described in which the ECU 10 includes the display instruction unit 72 that displays the "viable lane change segments" S1, S2, and S3 on the panel display 28 provided in the vehicle cabin, there is no limitation thereto. For example, in autonomous driving of level 4 or level 5, the vehicle control device may execute lane change automatically at one or other segment of the extracted "viable lane change segments" without displaying the "viable lane change segments" on a display section.

Furthermore, although in the above exemplary embodiment an example was described in which the display instruction unit 72 displays the "viable lane change segments" S1, S2, and S3 together with a map illustrating the travel route on the panel display 28, there is no limitation thereto. For example, in a case in which, while the ego-vehicle is traveling on an expressway, an image including a sequence of names of service areas, parking areas, interchanges, and the like that are anticipated to be passed are displayed in a row with a uniform spacing therebetween on a display section such as a panel display or the like, "viable lane change segment" may also be displayed together on this display.

Furthermore, although in the above exemplary embodiment an example was described in which the ECU 10 includes the desired lane change segment reception unit that receives information related to the segment that the occupant desires a lane change to be performed in from the steering switch 16A, and the lane change is executed at the segment at which the occupant desires a lane change, there is no limitation thereto. For example, the vehicle control device may end processing without displaying viable lane change segments on the map in cases in which the occupant has not agreed at step S126 of FIG. 5.

Moreover, although in the above exemplary embodiment an example was described in which the display instruction unit 72 displayed each of the viable lane change segments together with their easiness levels on the panel display 28, there is no limitation thereto. For example, the vehicle control device may be configured so as not to display easiness levels at step S128 of FIG. 5 or at step S140 of FIG. 7.

Furthermore, although in the above exemplary embodiment an example was described including an easiest segment identification unit that identifies the "easiest viable lane change segment", there is no limitation thereto. For example, in cases in which an occupant selection has not been received at step S142 of FIG. 7, a lane change may be executed automatically in the "viable lane change segment" first arrived at.

Furthermore, although in the second example processing of the above exemplary embodiment an example has been described in which the display instruction unit 72 displays a statement that lane change will be performed in advance owing to traffic conditions on the panel display 28 in cases in which the "easiest viable lane change segment" is remote from the limit point by the specific distance or greater, there is no limitation thereto, and such display may be omitted.

Moreover, in the first example processing of above exemplary embodiment an example was described in which in cases in which the "easiest viable lane change segment" was remote from the limit point L by the specific distance or greater, the ECU 10 displays the proposal stating that lane change will be performed in advance owing to traffic conditions (see FIG. 6) on the panel display 28, information related to whether or not the occupant has agreed to this proposal is received from the steering switch 16A, and the lane change is executed at the "easiest viable lane change segment" when agreement from the occupant has been received. There is, however, no limitation thereto and a statement that lane change will be performed in advance owing to traffic conditions as in the second example may be simply displayed as illustrated in FIG. 9, and then the lane change performed without giving a choice to the occupant. In other words the vehicle control device does not necessarily include an agreement reception unit.

Furthermore, although in the above exemplary embodiment an example was described in which the ECU 10 directly controlled the actuator group 38 so as to execute a lane change, there is no limitation thereto and, for example, the vehicle control device may output an instruction signal to change lanes to an ADAS-ECU connected to an actuator group.

What is claimed is:

1. A vehicle control device installed at a vehicle configured to perform driving assistance, the vehicle control device comprising a processor, wherein the processor is configured to:
   in cases in which there is a need to change lanes at or before a specific limit point on a route to a destination, acquire traffic information for a travel route from a current position to the limit point;
   compute an easiness level of lane change by driving assistance in a plurality of segments on the travel route based on the acquired traffic information;
   extract any segments for which the easiness level computed is a reference level or higher as viable lane change segments; and
   in cases in which at least one of the viable lane change segments has been extracted, execute a lane change in any one of the at least one viable lane change segments that have been extracted,
   wherein predicted traffic jam information is included in the traffic information.

2. The vehicle control device of claim 1, wherein the processor is configured to display the viable lane change segments on a display section together with a map illustrating the travel route.

3. A vehicle control device installed at a vehicle configured to perform driving assistance, the vehicle control device comprising a processor, wherein the processor is configured to:
   in cases in which there is a need to change lanes at or before a specific limit point on a route to a destination, acquire traffic information for a travel route from a current position to the limit point;
   compute an easiness level of lane change by driving assistance in a plurality of segments on the travel route based on the acquired traffic information;

extract any segments for which the easiness level computed is a reference level or higher as viable lane change segments;

in cases in which at least one of the viable lane change segments has been extracted, execute a lane change in any one of the at least one viable lane change segments that have been extracted, display the viable lane change segments on a display section provided in a cabin of the vehicle, in cases in which a plurality of the viable lane change segments have been extracted, receive information from an input section provided in the vehicle cabin related to a segment among the plurality of viable lane change segments at which an occupant desires a lane change to be performed; and execute a lane change in the segment at which the occupant desires a lane change to be performed based on the information related to the segment received from the input section.

4. The vehicle control device of claim 3, wherein the processor displays the computed easiness level together with the respective viable lane change segments on the display section.

5. A vehicle control device installed at a vehicle configured to perform driving assistance, the vehicle control device comprising a processor, wherein the processor is configured to:

in cases in which there is a need to change lanes at or before a specific limit point on a route to a destination, acquire traffic information for a travel route from a current position to the limit point;

compute an easiness level of lane change by driving assistance in a plurality of segments on the travel route based on the acquired traffic information;

extract any segments for which the easiness level computed is a reference level or higher as viable lane change segments;

in cases in which at least one of the viable lane change segments has been extracted, execute a lane change in any one of the at least one viable lane change segments that have been extracted, in cases in which a plurality of the viable lane change segments have been extracted, identify a segment at which a lane change is able to be performed most easily from among the plurality of viable lane change segments based on the computed easiness levels; and execute a lane change in an easiest viable lane change segment.

6. The vehicle control device of claim 5, wherein the processor displays a statement that lane change will be performed in advance owing to traffic conditions on a display section provided in a cabin of the vehicle in cases in which the easiest viable lane change segment is remote from the limit point by a specific distance or greater.

7. The vehicle control device of claim 5, wherein the processor:

displays a proposal that lane change will be performed in advance owing to traffic conditions on a display section provided in a cabin of the vehicle in cases in which the easiest viable lane change segment is remote from the limit point by a specific distance or greater;

receives information related to whether or not an occupant of the vehicle agrees to the proposal from an input section provided in a cabin of the vehicle and configured for input by the occupant; and executes a lane change at the easiest viable lane change segment in cases in which agreement from the occupant has been received.

8. A vehicle control method according to which a computer executes processing employed in a vehicle configured to perform driving assistance, the processing comprising, by a processor:

in cases in which there is a need to change lanes at or before a specific limit point on a route to a destination, acquiring traffic information for a travel route from a current position to the limit point;

computing an easiness level of lane change by driving assistance in a plurality of segments on the travel route based on the traffic information;

extracting any segments for which the easiness level is a reference level or higher as viable lane change segments; and in cases in which at least one of the viable lane change segments has been extracted, executing a lane change in any one of the at least one viable lane change segments that have been extracted, wherein predicted traffic jam information is included in the traffic information.

9. A non-transitory storage medium storing a program executable by a computer to perform processing employed in a vehicle configured to perform driving assistance, the processing comprising:

in cases in which there is a need to change lanes at or before a specific limit point on a route to a destination, acquiring traffic information for a travel route from a current position to the limit point;

computing an easiness level of lane change by driving assistance in a plurality of segments on the travel route based on the traffic information;

extracting any segments for which the easiness level is a reference level or higher as viable lane change segments; and in cases in which at least one of the viable lane change segments has been extracted, executing a lane change in any one of the at least one viable lane change segments that have been extracted, wherein predicted traffic jam information is included in the traffic information.

10. A vehicle control device installed at a vehicle configured to perform driving assistance, the vehicle control device comprising a processor, wherein the processor is configured to:

in cases in which there is a need to change lanes at or before a specific limit point on a route to a destination, acquire traffic information for a travel route from a current position to the limit point;

compute an easiness level of lane change by driving assistance in a plurality of segments on the travel route based on the acquired traffic information;

extract any segments for which the easiness level computed is a reference level or higher as viable lane change segments; and in cases in which at least one of the viable lane change segments has been extracted, execute a lane change in any one of the at least one viable lane change segments that have been extracted, wherein the processor computes the easiness level by predicting respective anticipated arrival times at which the vehicle will arrive at each of a plurality of segments on the travel route based on the traffic information, and determining whether or not each of the plurality of segments will be passable and how congested it will be at the expected arrival time.

\* \* \* \* \*